United States Patent

Schilling

[15] 3,696,352

[45] Oct. 3, 1972

[54] MAGNETO-OPTICAL READOUT BEAM SHIFTED AS A FUNCTION OF INFORMATION

[72] Inventor: Heinz Schilling, Magdeburg, Germany

[73] Assignee: VEB Kombinat Robatron, Radeberg, Wilhelm-Pieckstrasse, Germany

[22] Filed: Nov. 25, 1970

[21] Appl. No.: 92,625

[52] U.S. Cl. .....................340/174.1 M, 340/174 YC

[51] Int. Cl. ..............................................G11b 7/12

[58] Field of Search..340/174 YC, 174.1 M, 173 LT; 350/151, 152

[56] References Cited

UNITED STATES PATENTS

| | | | |
|---|---|---|---|
| 3,224,333 | 12/1965 | Kolk, Jr. et al. | 340/174 YC |
| 3,229,273 | 1/1966 | Baaba et al | 340/174 M |
| 3,284,785 | 11/1966 | Kornel | 340/174.1 M |
| 3,491,351 | 1/1970 | Smaller et al. | 340/174.1 M |
| 3,545,840 | 12/1970 | Ferguson | 340/174.1 M |
| 3,474,431 | 10/1969 | Griffiths | 340/174.1 M |
| 3,474,428 | 10/1969 | Nelson et al. | 340/174.1 M |
| 3,566,383 | 2/1971 | Smith | 340/174.1 M |
| 3,472,575 | 10/1969 | Hunt | 340/174 YC |

*Primary Examiner*—Vincent P. Canney
*Attorney*—Nolte and Nolte

[57] ABSTRACT

Magnetically stored information is retrieved or picked-up in a magneto-optical manner by successively scanning magnetic storage elements in a magnetic storage member with a beam of polarized electro-magnetic radiation at such critical angle of incidence that the reflected beam is shifted and reflected or reflected without shift depending upon the direction of magnetization present in said storage elements which direction may assume but two possible values representing a digital "1" or a digital "0." The shift or its absence is ascertained as representing said information by means of at least one receiver and an orifice means or shutter positioned relative to said magnetic storage member and relative to a scanner so as to assure said critical angle. The storage member comprises a total reflection layer on top of a layer including said magnetic storage elements.

14 Claims, 2 Drawing Figures

INVENTOR.
HEINZ SCHILLING
BY *Nolte & Nolte*
ATTORNEYS

MAGNETO-OPTICAL READOUT BEAM SHIFTED AS A FUNCTION OF INFORMATION

BACKGROUND OF THE INVENTION

The present invention relates to a magnetic storage member as well as to a method and apparatus for retrieving magnetically stored information from said member. More specifically, the invention relates to information retrieving in a magneto-optical manner.

Several methods for the magneto-optical retrieval of digital information have become known whereby the information is recorded by magnetizing a storage medium. The storage medium comprises storage elements or cells in which the direction of the vector representing the magnetization can assume at any one instance one of two possible directions whereby one direction represents the digital "1" information while the other direction represents the digital "0" information. Reproducing devices constructed for this purpose are based on magneto-optical effects which make possible an increased information density as well as an accelerated information flow as compared to data processing devices which are controlled by mechanical and electrical processes.

One known method for scanning a storage means is based on the Kerr-effect wherein an electro-magnetic radiation is reflected by the storage medium or wherein the radiation passes through the storage medium. The different magnetizations of the storage medium, which represent the stored information, cause a change in the amplitude of the reflected beam or of the beam passing through the storage medium.

Yet another known method is based on the Faraday-effect. In this method, the rotation of the oscillatory plane of the beam which has been reflected by the storage medium or of the beam which has passed through the storage medium, relative to the incidence beam represents a measure for the magnetization present at the point of the storage medium which is being scanned by the incidence beam, such magnetization corresponding to the stored information.

The known methods have a substantial drawback which is seen in the fact that the sensitivities of the mentioned effects are rather low. For example, the factor representing the energy transformation in the longitudinal Kerr-effect is equal to $10^{-6}$. Stated differently, on the average only one photon out of one million photons is converted into the different oscillatory state. It is possible to increase the energy transformation by a factor of 20 (energy transformation factor $= 2 \cdot 10^{-5}$) by employing optical systems comprising a plurality of layers. However, such plurality of layers sharply increase the critical or tolerance condition regarding the angle of incidence as well as regarding the wave length of the electro-magnetical radiation. Furthermore, the tolerance conditions regarding the thickness of the layers is also sharply increased. The maintaining of highly precise tolerances not only complicates the mass production of the respective circuit elements it also increases the costs.

OBJECTS OF THE INVENTION

In view of the foregoing the invention aims at achieving the following objects:

to provide a magnetic storage member suitable for magneto-optical information retrieval;

to provide an apparatus for magneto-optical retrieval of magnetically stored information;

to provide a method for magneto-optical information retrieval;

to improve the ratio of the information parameters of the retrieved or output signals relative to the Kerr-effect by several orders of magnitude;

to increase the sensitivity of magneto-optical information retrieval;

to utilize the shift which occurs in connection with the total reflection of a beam of electro-magnetic radiation for the pick-up or retrieval of magnetically stored information whereby the shift is a measure for the information, for example, in the form of a digital "1" or a digital "0;"

to define a critical angle of incidence of a scanning beam of polarized electro-magnetic radiation which will cause a large shift of the reflected beam, and to employ a polarized laser beam as a scanning beam for said retrieval.

SUMMARY OF THE INVENTION

According to the invention it has been discovered that magnetically stored information may be retrieved with a high degree of sensitivity by employing the physical effect which takes place in connection with the total reflection in the form of a shift of the reflected beam, whereby a widening of the reflected beam may occur or even a definite spacing between the incidence beam and the reflected beam. This effect occurs when a light beam is reflected at a medium which has a lower optical density than the incidence medium and if the angle of incidence approaches or exceeds the critical or limit angle required for the total reflection. The shift is due to the fact that the electro-magnetic oscillation penetrates into the adjacent optically less dense medium whereby the reflected beam is shifted relative to the point of entrance by several wave lengths. Large values for the beam shift, that is a large spacing between the point of entrance of the incidence beam and the point of exit of the reflected beam, result only if the angle of incidence is within a very narrow range about the critical angle of the total reflection.

According to the invention there is provided a method in which a polarized electro-magnetic radiation is used to successively scan the storage elements or cells of a storage medium which is positioned in contact with an incidence or reflection medium. The scanning beam is directed toward to interface between the two media at a critical angle which causes a substantial shift of the reflected beam as explained above. The normally reflected beam, that is the beam which is reflected without any shift and the beam which is reflected with a substantial shift, represent a measure for the information stored in the respectively magnetized storage element whereby preferably the incidence medium has a larger optical density than the storage medium and whereby both media have a small absorption factor while their dielectric losses should possibly be substantially equal to each other.

Magnetic substances have two critical angles. Their position or value depends on the magnetization. However, large beam shifts of the reflected beam occur only for one critical angle. Upon reversal of the magnetization the critical angle corresponding to a large beam shift changes to an angle corresponding to a small or no beam shift and vice versa. Accordingly, the angle of incidence must be selected for one of the two directions of magnetization in such a manner that it corresponds as precisely as possible to the critical angle which causes a substantial shift of the reflected beam.

The electro-magnetic radiation of the scanning beam is suitably a polarized laser beam.

The apparatus according to the invention comprises aperture means, for example a shutter for distinguishing the beam which is reflected without any shift from the beam which is shifted and reflected. In the following text the beam reflected without shift will be referred to as the normally reflected beam whereas the other beam will be referred to as a shifted and reflected beam. The aperture means is arranged in the path of at least one of the two reflected beams. Receiver means are provided which receive the beam which passes through the aperture in the aperture means whereas the other beam is prevented from being received by said aperture means.

In another embodiment of the present apparatus, it is possible to employ aperture means in the path of both beams whereby the aperture means comprise two apertures one for each beam. In this embodiment two receiver means are provided and the aperture means permit the passage of one beam to one receiver and of the other beam to the other receiver.

In another embodiment of the invention the two reflected beams are distinguished from each other by measuring the reflected radiation intensity which impinges upon a receiving surface. In this embodiment a shutter or aperture means arranged in the path of the reflected beams limits the size of area of the receiving surface in such a manner that the largest radiation intensity is measured when the reflected beam is the normally reflected beam. Accordingly, a smaller radiation intensity is measured when the shifted and reflected beam impinges upon said surface. A minute dispersion or variation in the wave length or a small diversion of the incidence beam causes in the shifted and reflected beam an increase in the beam width rather than a sharp image point. In this instance the reflected radiation intensity is distributed over a larger surface than the intensity of the normally reflected beam. Accordingly, the radiation intensity measured by the receiver when the normally reflected beam impinges upon the surface which is limited by the aperture means, is larger than the radiation intensity measured when the beam impinges upon said surface which has been widened by the shifting. Due to this feature, it is easy to distinguish the two stored informations from each other.

The most important advantage of the present method according to the invention is seen in that the sensitivity of the magneto-optical scanning or retrieving of the information stored in a storage member by magnetizing storage elements of such member is substantially larger than in methods known prior to the invention. Theoretically, it is possible to achieve an infinitely large sensitivity if the incidence or scanning polarized electro-magnetic radiation is directed toward the storage medium at a critical angle corresponding to a large beam shift. This is so because a large beam shift is obtained with respect to one of the stored informations and the shift may correspond to several hundred times the wave length of the radiation employed for the scanning. Contrary thereto practically no shift takes place with regard to the other of the two stored informations. Accordingly, rather large sensitivities have been accomplished by the invention.

The intensity of the beam which has been substantially shifted approaches the intensity of the incidence or scanning beam if the aperture in the aperture means is sufficiently large. However, for small apertures or shutter openings it is sufficient to utilize but a fraction of the incidence energy. Such fraction may be in the order of magnitude corresponding to 0.1 to 0.001 relative to the incidence energy. As compared to the prior art in which the maximum energy transformation factor is $2\cdot10^{-5}$ where the Kerr-effect is employed, the method according to the invention is more favorable by 2 to 4 orders of magnitude.

In order to achieve a high storage density it is suitable or preferable to employ shifting distances in the range of about 5 wave lengths relative to the wave length of the electro-magnetic radiation employed for the scanning. With this shifting distance it is possible to clearly distinguish the two possible reflected beams from each other by the means disclosed herein.

Even the laser beam is subjected to a widening of the width of the reflected beam due to small variations in the wave length and due to a small diversion of the electro-magnetic radiation. However, it is still possible to achieve a high sensitivity even where but one aperture means or shutter is employed for distinguishing the normally reflected beam from the beam which has been substantially shifted and reflected. In this instance, it is possible to achieve intensity differences between the two beams which are in the order of magnitude of 10 to $10^3$ simply by properly dimensioning the shutter opening. Such intensity differences on the one hand make it possible to unambiguously distinguish the two beams from each other and on the other hand they exclude an erroneous registration due to occurring disturbances.

Yet another advantage of the invention is seen in the fact that due to the high sensitivity the evaluating circuit means, which are connected to the receiving means proper for improving the signal to noise ratio, do not have to meet high specification requirements.

In order that the invention may be clearly understood, it will now be described, by way of example, with reference to the accompanying drawings, wherein:

FIG. 1 shows a magnetization vector Mv which is directed into the plane defined by the sheet of drawing. This vector M*v* represents the general direction of the magnetization of a storage cell or element 3 or 3′ of the storage medium 2 which may be in the form of a layer as shown in FIG. 2.

Figure 2:
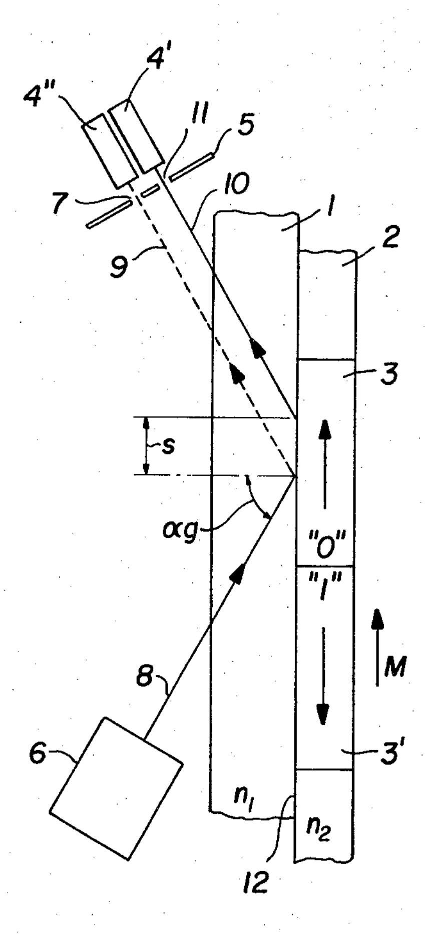
FIG. 2 is a simplified diagram illustrating an apparatus for performing the method of the invention.

The storage member shown in FIG. 2 further comprises an incidence medium 1 which is coextensive with the storage medium 2 whereby an interface 12 is formed between the two media 1 and 2. Although the reflection takes place at the interface 12 the incidence medium 1 will be referred to as the reflection layer in the following text and the storage medium 2 will be referred to as the storage layer for simplicity's sake.

The magnetizing vector Mv and the normal *n* of the interface 12 define therebetween an angle *x*.

Figure 1:
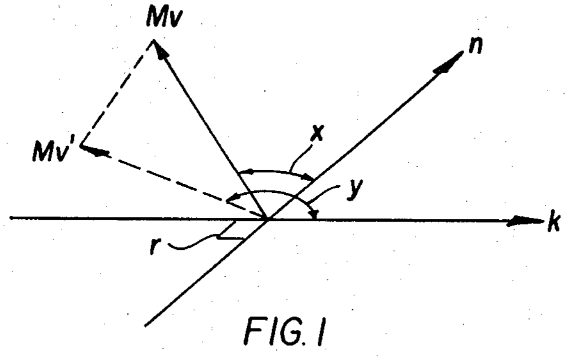
FIG. 1 is a vector diagram illustrating the critical angle of incidence.

The projection M*v* of the magnetizing vector M*v* onto the plane of the interface 12 defines together with the section line *k* of the interface 12 and the plane of incidence of the scanning beam 8 an angle y which is also referred to as the azimuth of the plane of incidence relative to the principal section of the interface 12. In this connection, it is to be noted that the normal n of the interface 12 and the section line *k* extend perpendicularly to each other as indicated by the right angle *r* in FIG. 1. The corresponding critical or limit angle $\alpha g1$ and $\alpha g2$ are determined by means of the following equation (I) to values of the second order of magnitude.

(I) $$\sin^{\alpha} gl;\, 2 = \frac{n'_2}{n'_1} = \frac{n'_{20}}{n'_{10}}\left(1 + q\,\frac{\sin x \cos v}{2}\right)$$

wherein $0 \leqq x \leqq \pi$ and $0 \leqq y < 2\pi$

In the foregoing equation q is the gyrotropic constant of the storage layer 2. The reflection indices for the reflection layer 1 and for the storage layer 2 are designated by $n'$ with the respective index whereby no magnetization M*v* is applied and whereby it is assumed that the refraction index is relative to vacuum.

In order to obtain a real value for the critical angle $\alpha g$ of the total reflection it is necessary to use for the reflection layer a material having a high refraction, for example, high refractive flint glass, that is $n'_{10} > n'_{20}$ must apply.

The change in the direction of the magnetization M*v*, that is the storage of a different information results in a changed critical angle $\alpha g$ because according to equation $$\alpha_g = \alpha_g\,(Mv) \qquad \text{II}$$

FIG. 2 illustrates an apparatus for performing the present method. The storage medium or storage layer 2 has a refraction index $n'_{20} = 2.1$. The incidence medium or reflection layer 1 has a refraction index $n'_{10} = 2.4$. The two layers are arranged in contact with each other to form the above mentioned interface 12. A radiation source 6 comprising polarization means emits a laser beam 8 at a critical angle of incidence $\alpha g$. The laser beam scans the storage elements 3 and 3' in the storage layer 2. For example, the storage elements 3 has stored therein a digital information "0" whereas the storage element 3' has stored therein a digital information "1."

Depending on the direction of magnetization in the storage elements the beam 9 will be reflected without a shift whereas the beam 10 is reflected with a shift *s* as shown in FIG. 2.

An aperture means or shutter 5 having apertures 7 and 11 therein is positioned in the path of the reflected beams 9 and 10. Two receiver means 4' and 4'' are positioned behind the shutter 5. However, it is also possible to perform the present invention with but one receiver as has been described above.

The radiation source 6 emits a left rotating circularly polarized laser radiation in the infrared frequency range. Such radiation has a wave length in the range of $w = 1\mu m$. The radiation is absorbed only slightly by the two adjacent layers 1 and 2. The dielectric losses of the material of which the two layers 1 and 2 are made are substantially equal to each other. As mentioned, the digital informations "0" and "1" are stored in said storage elements 3 and 3' by the longitudinal magnetization Mv in a parallel or in an anti-parallel fashion relative to an external magnetic field M.

In connection with the foregoing considerations the following conditions apply for angle *x* and *y* with regard to the digital information "0;"

(III) $$x = \pi/2 \text{ and } y = \pi$$

and with regard to the digital information "1" the following applies with regard to said angles;

(IV) $$x = \pi/2 \text{ and } y = 0.$$

The gyrotropic constant q has for the employed wave length and for the storage material here involved a value of $q = 10^{-3}$ whereby the imaginary portion may be disregarded. According to equation (I) it follows if the values according to equation (III) above are inserted in equation (I) that a critical angle of incidence corresponds to (I*a*) $$\alpha_{g''} = \alpha_{g1} = 61°.$$

which angle applies to the direction of the magnetizing vector Mvo parallel to the external magnetic field M and corresponding to the digital information "0."

Contrary thereto where the digital information "1" is stored that is, where the longitudinal anti-parallel magnetizing vector Mv in the storage cell 3' is involved the following critical angle $\alpha g$ for a substantial beam shift may be calculated by inserting the values given under (IV) above into equation (I).

(I*b*) $$\alpha_{g''1''} = \alpha_g^2 = 61°06'.$$

If the left rotating polarized incidence laser beam 8 is directed constantly at the angle of incidence $\alpha g = 61°$ toward the storage elements 3, a large shift *s* of the reflected beam 10 will result if the digital information "0" is stored in the storage element and thus a widening of the width of the reflected beam 10.

Assuming that the shift effect has a half width of one quarter of an angle minute it follows for the maximum shift $s_{max}$;

(V) $$S_{max} \geqq 100\ 10^{-4} \text{ meter} = 0.1\text{mm}.$$

Contrary to the foregoing a normally reflected beam 9 is obtained for the digital information "1" stored in the storage element 3' which is practically not shifted and which does not show any widening of the beam width. The normally reflected beam 9 is shown as a dashed line in FIG. 2.

According to FIG. 2 the normally reflected beam 9 is sensed by the receiver 4'' and the substantially shifted and reflected beam 10 is sensed by the receiver 4'. The shutter or aperture means 5 is arranged to pass the beam 9, 10 through respective apertures 7, 11. The shutter 5 shields the receivers against possible stray light.

The scanning of the beam with respect to the magnetic elements may be accomplished in any conventional manner, such as by movement of the storage member, or by movement of the laser source and receiver system.

It is to be understood that the invention is not limited to the specific examples shown. Other methods for sensing the reflected beams may be employed. It is also possible to select a critical angle of incidence which will result in a large or substantial shift in response to the opposite magnetization direction. Although a circularly, polarized scanning radiation has been used in the foregoing specification, elliptically or linearly polarized electro-magnetic radiation is also suitable for the scanning. Accordingly, it is intended to cover all modifications and equivalents within the scope of the appended claims.

What is claimed is:

1. A magneto-optical method of retrieving magnetically stored information from a magnetic storage member including a reflection layer and a layer of magnetic storage elements with an interface between said layers, wherein the direction of magnetization assumes in said magnetic storage elements one of two possible directions representing a digital "1" or a digital "0," comprising successively scanning said magnetic storage elements one after the other with a beam of polarized electro-magnetic radiation having a given beam width while simultaneously directing such beam toward the storage member at such a critical angle of incidence that a shift and reflection of said beam takes place in response to scanning a magnetic storage element which is magnetized in one of said two possible directions, and that a reflection takes place substantially without any shift in response to scanning a magnetic storage element which is magnetized in the other of said two possible directions, and receiving said reflected beam for ascertaining its information content.

2. The method according to claim 1, wherein said shift of the reflected beam causes an enlarged beam width of the reflected beam as compared to said given beam width of the scanning beam.

3. The method according to claim 2, further comprising receiving said reflected enlarged width beam for ascertaining its information content.

4. The method according to claim 1, in which said scanning step comprises scanning said elements with a polarized laser beam.

5. The method according to claim 1, further comprising defining a receiving surface for said reflected beam, said receiving surface having a predetermined surface area, and ascertaining the difference between the radiation intensity of said reflected beams impinging upon said receiving surface area for distinguishing the digital "0" information from the digital "1" information.

6. The method according to claim 1, wherein said scanning beam is directed toward said magnetic storage member to first penetrate said reflection layer for reflection at said interface between the layers.

7. The method according to claim 1, wherein said scanning beam is directed toward said magnetic storage member to first penetrate said layer of magnetic storage elements for reflection at said interface between the layers.

8. An apparatus for retriving magnetically stored information comprising means for emitting a scanning beam of polarized electro-magnetic radiation, a magnetic storage member comprising a reflection layer, a layer of magnetic storage elements, and an interface between said layers, said interface defining a reference plane, and receiver means including aperture means for receiving a reflected beam; said emitting means having a beam emitting axis positioned relative to said reference plane so that said scanning beam has a critical angle of incidence which will cause a shift of said reflected beam depending upon the direction of magnetization of the particular magnetic storage element, said receiver and aperture means being located relative to said reference plane so that a reflected beam which is shifted is received through said aperture with a different intensity than a reflected beam which is normally reflected.

9. The apparatus according to claim 8, wherein said receiver means comprise two receivers and said aperture means is positioned for admitting a reflected and shifted beam to one of said receivers and a normally reflected beam to the other of said receivers.

10. A magnetic storage member comprising a reflection layer and a layer of magnetic storage elements with an interface between said layers, said layers having different optical densities, substantially the same dielectric losses, and a relatively small absorption factor for polarized electro-magnetic radiation, means positioned to direct a beam of polarized electromagnetic radiation toward said interface at a critical angle at which a shift of the reflected beam occurs in response to the direction of magnetization of said elements, and means for detecting shifts in said reflected beam.

11. The magnetic storage member according to claim 10, wherein said reflection layer has a larger optical density than said layer of magnetic storage elements.

12. The magnetic storage member according to claim 11, wherein said reflection layer is made of highly refractive flint glass.

13. An apparatus for retrieving magnetically stored information from a magnetic storage member comprising a layer of a reflection material adapted to be positioned in contact with said storage member to form an interface therebetween, a source of polarized electromagnetic radiation directed toward said interface at a critical angle at which a shift of the reflected beam from said interface occurs in response to the direction of magnetization of said member, and means for detecting shifts in said reflector beam.

14. The apparatus of claim 13 wherein said magnetic storage member is movable with respect to said source and detecting means for scanning said storage member with said radiation.

* * * * *

PO-1050
(5/69)

UNITED STATES PATENT OFFICE
CERTIFICATE OF CORRECTION

Patent No. 3,696,352 Dated October 3, 1972

Inventor(s) Heinz Schilling

It is certified that error appears in the above-identified patent and that said Letters Patent are hereby corrected as shown below:

CORRECT SPELLING OF ASSIGNEE NAME
FROM: VEB Kombinat ROBATRON
TO: VEB Kombinat ROBOTRON

Signed and sealed this 20th day of February 1973.

(SEAL)
Attest:

EDWARD M.FLETCHER,JR.
Attesting Officer

ROBERT GOTTSCHALK
Commissioner of Patents